No. 773,502. PATENTED OCT. 25, 1904.
E. N. HUMPHREY.
FASTENER.
APPLICATION FILED JAN. 2, 1904.
NO MODEL.

WITNESSES:
E. R. Bunger
May M. Plyer

INVENTOR:
Ernest N. Humphrey
by Jas. L. Skidmore
his attorney.

No. 773,502.                                     Patented October 25, 1904.

UNITED STATES PATENT OFFICE.

ERNEST N. HUMPHREY, OF NEW BRITAIN, CONNECTICUT, ASSIGNOR TO UNITED STATES FASTENER COMPANY, OF PORTLAND, MAINE.

FASTENER.

SPECIFICATION forming part of Letters Patent No. 773,502, dated October 25, 1904.

Application filed January 2, 1904. Serial No. 187,558. (No model.)

*To all whom it may concern:*

Be it known that I, ERNEST N. HUMPHREY, of New Britain, in the county of Hartford and State of Connecticut, have invented a new and useful Improvement in Fasteners, of which the following, taken in connection with the accompanying drawings, is a specification.

This invention relates to fasteners for garments; and the prime object of the same is to provide reliable and efficient means for securing a button or a ball or socket member of a fastening to sleazy, spongy, or flimsy leather or material. It has been found in practice that many of the fasteners of this character are provided with means for attachment which fail to meet all the requirements of varying conditions and qualities of leather and fabric. Many of the fasteners in use cannot be firmly secured to materials of a sleazy, spongy, flimsy, or weak character, while in strong and firm leather or fabric the same may be secured in many efficient ways. In securing fasteners to flimsy material it is very desirable to have the prongs curl or clench inwardly to draw the material inward and under the fastener.

Figure 1:
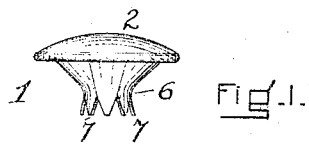
Figure 3:
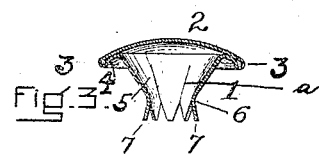
Figure 2:
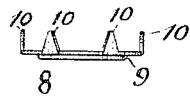
Figure 4:
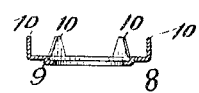
Figure 5:
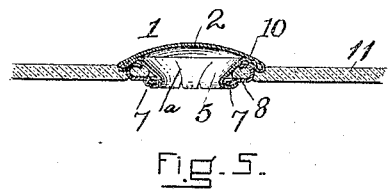
Figure 6:
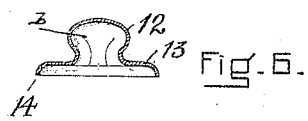
Figure 8:
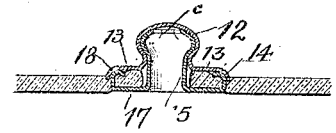
Figure 7:
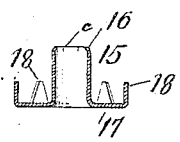
Figure 9:
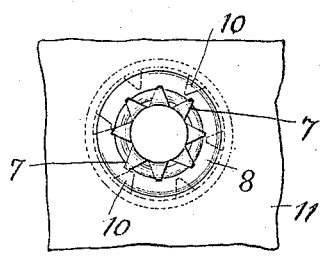

In the accompanying drawings, Figure 1 is a side elevation of a socket member of a fastener made in accordance with this invention. Fig. 2 is a similar view of the ring or washer for securing the socket to the material. Fig. 3 is a central vertical section of the socket member. Fig. 4 is a like view of the ring or washer for securing the socket to the material. Fig. 5 is a sectional view showing the socket member secured to a piece of material or fabric. Fig. 6 is a sectional view of the ball member of the fastener. Fig. 7 is a like view of the fastening-eyelet for said ball member. Fig. 8 is a view in section of the ball member secured to a piece of material or fabric. Fig. 9 is a bottom plan view of the socket member secured to the fabric or material as shown in section in Fig. 5.

Like characters designate like parts wherever they occur in the different views of the drawings.

The numeral 1 designates the socket member, comprising the cap or cover 2, having on its outer edge or periphery 3 the integral portion 4, curled back and under the periphery 3 and then downwardly to form the inverted conical socket 5. The socket 5 is contracted near its lower end, as at 6, and the ends of the fastening-prongs 7 are bent outward, as shown in Figs. 1 and 2, in order that said prongs will curl or clench outwardly during the operation of securing the member to the material. If it is desired to make the socket 5 resilient, slits *a* may be formed therein. The ring or washer 8 is provided with a central opening, the edge of which is offset from the plane of the ring or washer, as at 9, in order that the mouth of the socket when secured to the material will occupy a plane in line with or below the under surface of the material or fabric. Prongs or fastening-points 10 project upward from the outer edge of the washer or ring 8. To secure this socket member to the material, as shown in Figs. 5 and 9, the material 11 is placed between the socket member 1 and the ring or washer 8 and pressure is applied to the socket and ring, the prongs 10 on the ring passing up through the material and curling inwardly against the integral portion 4 of the cap and the prongs 7 passing through the central opening in the washer or ring 8 and turning outward against the offset portion 9 of said ring. The socket is thus firmly secured to the material at several points around the socket, and the prongs 7 are concealed under the cap or cover 2.

The ball member comprises the bulb 12, having a flange 13 the outer edge 14 of which curves downwardly to form an upsetting-surface for the prongs of the fastening-eyelet 15. This eyelet 15 has an inwardly-inclined upper end 16, which may be provided with slits *c* and a base-flange 17, the fastening-prongs 18 projecting upwardly from the outer edge of the flange 17. If the bulb 12 is to be made resilient for use with a rigid socket member, slits *b* may be formed therein.

To secure the ball member to the material, the two parts are placed upon opposite sides of the material and pressure is applied, the upper end of the eyelet being curled inward and the body portion of said eyelet being bulged outward to assume the contour of the inner wall of the ball member above the material, while the prongs 18 pass up through the material and are clenched inwardly against the curved edge 14 of the ball-flange.

From the foregoing it will be observed that both members of the fastener are secured to the material by prongs upset against and concealed by the upper part or piece and that the prongs curl inward to draw the material inward toward the center of the fastener to resist the outward strain of the material in use. It will be noted that the inward curl of the prongs 10 and 18 is not restricted by any part of the fastener between the cap and prongs, and said prongs are therefore free to draw the material toward the center. By thus gripping the material not only at the center of the fasterner, as is customary, but also at the periphery of the fastener a much firmer hold is had, and where the material used is weak, sleazy, or easily stretched it is held firmly and prevented from pulling away from the fastener.

It will be understood that either the socket member or the ball member may be made resilient by slitting the metal in an obvious manner.

What is claimed is—

1. A fastener comprising a cap or cover having an integral curved under surface designed to curl and clench the fastening-prongs, and a fastening device having prongs passing through the material and curled inward and clenched against said curved under surface to unrestrictedly draw said material inward toward the center of said fastening device to resist outward strains on the material in use.

2. A socket member of a fastener comprising a cap and integral socket-piece projecting from the inwardly-curled flange on the cap, outwardly-projecting prongs on the socket-piece, and a fastening-ring having prongs designed to be upset inwardly against the curled flange of the cap, substantially as shown and described.

3. A socket member comprising a cap and socket-piece, said socket-piece having a contracted neck and outwardly-projecting prongs, and a fastening-washer having an offset central opening and prongs projecting from its outer edge, substantially as shown and described.

4. A ball member of a fastener, comprising a bulb having a base-flange provided with a downwardly-curved outer edge to form an upsetting-surface for the fastener-prongs, and a fastener-eyelet having a flange, prongs at the outer edge of said flange, said prongs being curled inward toward the center of the fastener and upset against the curved outer edge of the flange of the bulb, and the tubular portion of the eyelet being upset against the inner wall of the bulb.

5. A ball member comprising a bulb having a base-flange, curved downwardly at its outer edge, and a fastening-eyelet having a base-flange, prongs at the outer edge of said flange, said prongs being curled inwardly toward the center of the eyelet and clenched against the curved portion of the flange of the bulb, the tubular portion of said eyelet having its upper end slitted and upset against the inner portion of the bulb.

6. A ball-and-socket fastener, comprising a socket member secured to the garment or material by a fastening-washer provided with an opening therein, an offset edge at the opening, and with prongs curled inward and clenched against a curved surface on the socket member, and a ball member comprising a bulb, a downwardly-curved flange, and a fastening-eyelet having a base-flange provided with peripheral prongs curled and clenched against the curved flange of the bulb, substantially as shown and described.

In testimony whereof I have signed my name to this specification, in the presence of two subscribing witnesses, on this 3d day of December, A. D. 1903.

ERNEST N. HUMPHREY.

Witnesses:
STANLEY PARKER,
SADIE L. FINNIGAN.